Patented Apr. 15, 1947

2,418,850

UNITED STATES PATENT OFFICE 2,418,850

CHEMICAL PROCESS AND PRODUCTS

Maynard S. Raasch, Wilmington, and Clement W. Theobald, Christiana Hundred, Del., assignors to E. I. du Pont de Nemours & Company, Wilmington, Del., a corporation of Delaware No Drawing. Application April 27, 1944, Serial No. 533,056

7 Claims. (Cl. 260—586)

This invention relates to new ketones and to a method for their preparation.

This invention has as an object the provision of new ketones. A further object is the provision of new cyclopentenones. A still further object is the production of 3- and 3, 4-substituted cyclopentenones. It is also among the particular objects of this invention: to provide 3-alkyl substituted cyclopentenones; to provide 3,4-alkyl substituted cyclopentenones; to provide 3-alkoxy substituted cyclopentenones; to provide 3,4-alkoxy substituted cyclopentenones; and to provide 3-methyl and 3,4-dimethyl cyclopentenones. Still further objects reside in methods for obtaining the above mentioned ketones. Additional objects will become apparent from an examination of the following description and claims.

These and other objects and advantages are accomplished according to the herein described invention which broadly comprises heating, under superatmospheric pressure and at a temperature within the range of from 125° C. to 250° C., carbon monoxide in contact with a substituted butadiene-1,3 having the general formula.

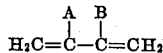

wherein the A substituent is selected from the group consisting of alkyl and alkoxy radicals and the B substituent is selected from the group consisting of hydrogen atoms and alkyl and alkoxy radicals, said substituted butadiene-1,3 being dissolved in an inert organic solvent containing an acidic material whose acid ionization constant is less than $2 \times 10^{-2}$, the reaction mixture having a pH within the range of from about 2 to about 6.

In a more restricted embodiment this invention comprises heating, under a pressure exceeding 500 atmospheres and at a temperature within the range of from 180° C. to 220° C., carbon monoxide in contact with a substituted butadiene-1,3 having the general formula

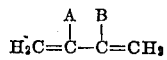

wherein the A substituent is selected from the group consisting of alkyl and alkoxy radicals and the B substituent is selected from the group consisting of hydrogen atoms and alkyl and alkoxy radicals, said substituted buatadiene-1,3 being dissolved in an alcohol having the general formula $C_nH_{2n+1}OH$ wherein $n$ is a positive integer within the range of from 1 to 4, said alcohol containing an acid having the general formula $C_nH_{2n+1}COOH$ wherein $n$ is a number selected from the group consisting of 0 and positive integers within the range of from 1 to 3, the reaction mixture having a pH within the range of from about 2 to about 6.

The novel products of this invention are 3- and 3,4-alkyl and alkoxy substituted cyclopentenones. In other words, said products are cyclopentenones containing a substituent selected from the group consisting of alkyl and alkoxy radicals attached to the 3-carbon atom of the cyclopentenone ring and a substituent selected from the group consisting of hydrogen atoms and alkyl and alkoxy radicals attached to the 4-carbon atom of the cyclopentenone ring.

The following examples, in which proportions are in parts by weight unless otherwise specified, are given for illustrative purposes and are not intended to place any restrictions or limitations on the herein described invention:

Example I

A solution containing 80 parts of absolute ethanol, 3 parts of acetic acid and 41 parts of 2,3-dimethylbutadiene-1,3 saturated with hydroquinone, is placed in a silver-lined shaker type autoclave provided with a high pressure gas inlet and a thermocouple well. The pH of the solution is 3.9. The oxygen present in the reactor is displaced with nitrogen and carbon monoxide is introduced under 385 atmospheres pressure. The temperature of the reaction mixture is raised and maintained at 200° C. by means of external heating. At this temperature the pressure is increased to 850 atms. by the introduction of carbon monoxide and gradually raised to 950 atms. during the next hour. The carbon monoxide which is being consumed is replaced periodically in such a manner that the pressure is maintained at 900 to 950 atms. Reaction is substantially complete after two hours, but the reaction conditions of temperature and pressure are maintained for 6 hours more.

Upon cooling, the unreacted carbon monoxide is bled off and the reaction product is isolated by decanting the supernatant ethanolic solution from the insoluble hydrocarbon portion, and subjecting the former to distillation. After removal of ethanol and unreacted diene, the residue is subjected to distillation. The fraction boiling at 73° to 79° C. at 9 mm. consists mainly of a ketone with a small amount of a higher boiling dimer of 2,3-dimethylbutadiene-1,3. This ketone reacts with 2,4-dinitrophenyl-hydrazine to give a derivative melting at 178° to 178.5° C. and whose composition is shown by analysis to be $C_{13}H_{14}N_4O_4$, which is in accord with the expected composition and properties of a 3,4- dimethylcyclopentenone.

*Example II*

A solution containing 80 parts of ethanol, 34 parts of 2-methylbutadiene-1,3, 3 parts of acetic acid and 1 part of hydroquinone is treated as in Example I at 200° C. for 13.5 hours under 820 to 995 atms. CO pressure. A pressure drop of 80 atms. occurs slowly during the entire reaction period.

A small amount of polymeric material (1 g. from 34 g. starting material) is removed and the liquid distilled. A small amount of 2-methylbutadiene-1,3 and alcohol is removed at atmospheric pressure and the residue distilled under reduced pressure. A ketonic fraction boiling at 70 to 80° C./40 mm. is obtained. A hydrocarbon fraction boiling at 80° C./40 mm. is also obtained. The 2,4-dinitrophenylhydrazone of the ketone melts at 181° to 182° and has the composition $C_{12}H_{12}N_4O_4$. Anal. Found: C, 52.05%; H, 4.37%; N, 19.6%. Calc. for $C_{12}H_{12}N_4O_4$: C, 52.17%; H, 4.38%; N, 20.28%. The ketone then has the composition $C_6H_8O$, which agrees with that of 3-methylcyclopentenone.

Although the above examples have illustrated the practice of this invention with 2,3-dimethylbutadiene-1,3 and 2-methylbutadiene-1,3, it is to be understood that the invention is applicable to any substituted butadiene-1,3 having the general formula

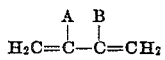

wherein the A substituent is selected from the group consisting of alkyl and alkoxy radicals and the B substituent is selected from the group consisting of hydrogen atoms and alkyl and alkoxy radicals. Specific examples of such dienes, in addition to 2,3-dimethylbutadiene-1,3 and 2-methylbutadiene-1,3 are 2-ethylbutadiene-1,3; 2-propylbutadiene-1,3-; 2,3-dimethoxybutadiene-1,3; 2,3-diethoxybutadiene-1,3; and the like.

In the practice of this invention there can be used temperatures ranging from 125° to 250° C. and pressures above atmospheric to a maximum determined by the practical limitations of the reaction vessel. It is preferred, on account of the superior yields thereby obtained, to operate at temperatures within the range of from 180° C. to 220° C. and at pressures in excess of 500 atmospheres.

The process is operated in the presence of an inert organic solvent such as an aliphatic alcohol, dioxane, benzene, and the like. The aliphatic alcohols and especially the lower aliphatic alcohols are the preferred solvents. For best results the concentration of the diene in the solution should be between 25% and 75%, by weight, although concentrations outside this range can be used if desired.

Any acidic material having an acid ionization constant less than $2 \times 10^{-2}$ can be used in adjusting the pH of the reaction medium. However, on account of the superior yields had therewith, the preferred acidic materials are carboxylic acids having the general formula $C_nH_{2n+1}COOH$ wherein $n$ is a member selected from the group consisting of 0 and positive integers, and especially the lower aliphatic monocarboxylic acids such as formic, acetic, propionic, butyric, and the like. In general, an amount of acid is used to give a pH in the reaction medium of from 2 to 6.

The use of a polymerization inhibitor for the diene is not essential to the practice of this invention. It is desirable, however, to add such a material since the yield of desired product is increased thereby by prevention of loss of diene through conversion to undesired polymerization products. In the preferred practice, therefore, the reaction is carried out in the presence of a polymerization inhibitor. Specific examples of such materials, in addition to hydroquinone, are phloroglucinol, catechol, phenol, and the like.

The process of this invention provides an easy and practicable method for preparing novel ketones. The reactions involved in the aforementioned process may be represented below. For convenience of illustration the reaction is presented for the conversion of 2,3-dimethylbutadiene to a 3,4-dimethylcyclopentenone.

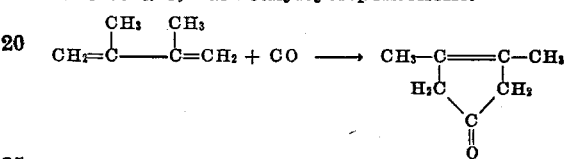

As hereinbefore stated, the novel products of this invention are 3- and 3,4-alkyl and alkoxy substituted cyclopentenones. Included among examples of said substituted cyclopentenones are: 3,4-dimethylcyclopentenone, 3-methylcyclopentenone; 3-ethylcyclopentenone, 3-propylcyclopentenone, 3,4-dimethoxycyclopentenone, 3,4-diethoxycyclopentenone, 3 - methyl-4-methoxycyclopentenone, and the like.

The substituted cyclopentenones of this invention are useful as solvents, and as intermediates in the synthesis of other organic products, such as resins, perfumes, secondary alcohols and dibasic acids.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. The process for obtaining a substituted cyclopentenone, which comprises heating, under superatmospheric pressure and at a temperature within the range of from 125° C. to 250° C., carbon monoxide in contact with a substituted butadiene-1,3 having the general formula

wherein the A substituent is an alkyl radical and the B substituent is selected from the group consisting of hydrogen atoms and alkyl radicals, said substituted butadiene-1,3 being dissolved in an inert organic solvent containing an acidic material having an acid ionization constant of less than $2 \times 10^{-2}$, the reaction mixture having a pH within the range of from about 2 to about 6.

2. The process for obtaining a substituted cyclopentenone, which comprises heating, under a pressure exceeding 500 atmospheres and at a temperature within the range of from 180° C. to 220° C., carbon monoxide in contact with a substituted butadiene-1,3 having the general formula

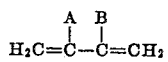

wherein the A substituent is an alkyl radical and the B substituent is selected from the group consisting of hydrogen atoms and alkyl radicals, said substituted butadiene-1,3 being dissolved in an alcohol having the general formula $C_nH_{2n+1}OH$ wherein $n$ is a positive integer within the range of from 1 to 4, said alcohol containing an acid having the general formula $C_nH_{2n+1}COOH$ wherein $n$ is a number selected from the group consisting of 0 and positive integers within the range of from 1 to 3, the reaction mixture having a pH within the range of from about 2 to about 6.

3. The process for obtaining 3,4-dimethylcyclopentenone, which comprises heating, under a pressure exceeding 500 atmospheres and at a temperature within the range of from 180° C. to 220° C., carbon monoxide in contact with 2,3-dimethylbutadiene-1,3 dissolved in ethanol containing acetic acid, the reaction mixture having a pH within the range of from about 2 to about 6.

4. The process for obtaining 3-methylcyclopentenone, which comprises heating, under a pressure exceeding 500 atmospheres and at a temperature within the range of from 180° C. to 220° C., carbon monoxide in contact with 2-methylbutadiene-1,3 dissolved in ethanol containing acetic acid, the reaction mixture having a pH within the range of from about 2 to about 6.

5. A cyclopentenone having the general formula

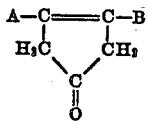

wherein A is an alkyl radical and B is of the group consisting of hydrogen atoms and alkyl radicals.

6. The compound, 3,4-dimethyl-Δ³-cyclopentenone having the structural formula

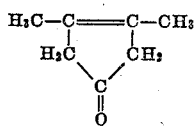

7. The compound 3-methyl-Δ³-cyclopentenone having the structural formula

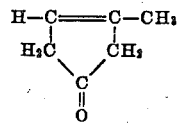

MAYNARD S. RAASCH.
CLEMENT W. THEOBALD.

REFERENCES CITED

The following references are of record in the file of this patent:

UNITED STATES PATENTS

| Number | Name | Date |
| --- | --- | --- |
| 1,973,662 | Schalch | Sept. 11, 1934 |

OTHER REFERENCES

Chemical Abst., vol. 7, page 3113 (1913) Abstracting an article by Godchob in Comptes rendues 156, pp. 1779–81.

Chemical Abst., vol. 8, page 1285 (1914) Abstracting article by Willstatter in Berichte 47, pp. 291–310.